Aug. 29, 1933.　　　A. G. STERN　　　1,924,136
PROCESS FOR HEATING MATERIALS
Filed April 2, 1931
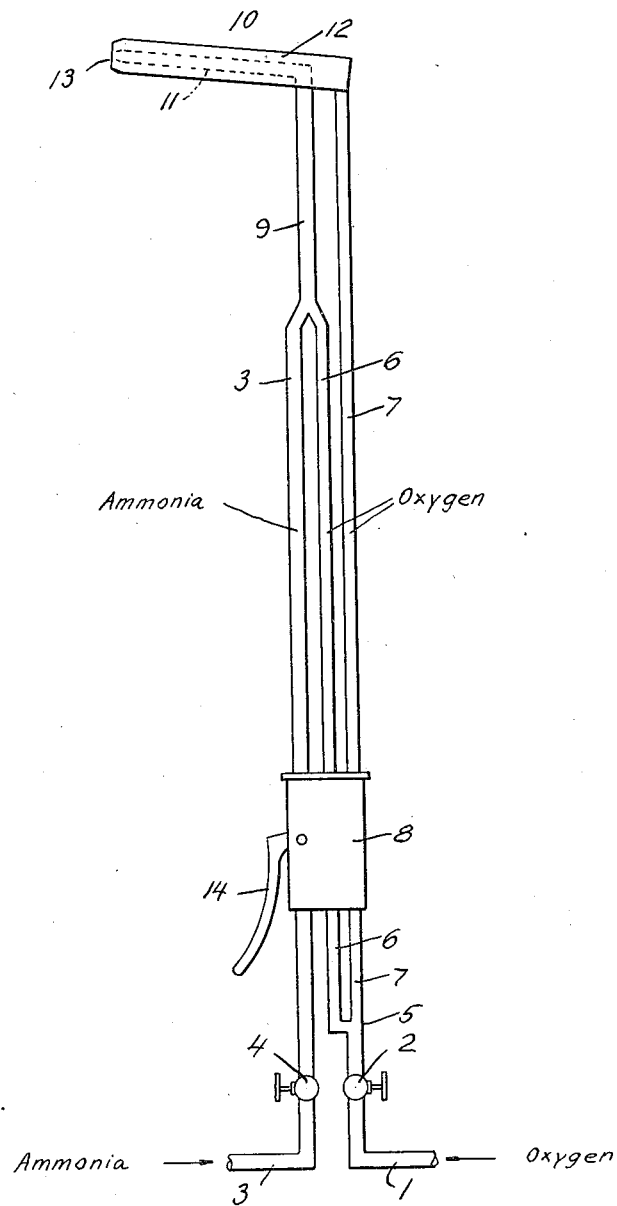
INVENTOR
Albert George Stern
BY
ATTORNEY Patented Aug. 29, 1933

1,924,136

UNITED STATES PATENT OFFICE 1,924,136

PROCESS FOR HEATING MATERIALS

Albert George Stern, New York, N. Y., assignor to The Barrett Company, New York, N. Y., a Corporation of New Jersey Application April 2, 1931. Serial No. 527,185

6 Claims. (Cl. 148—9)

This invention relates to a method of producing a zone of high temperature by the combustion of ammonia. More particularly, this invention relates to a process for the cutting, brazing or welding of metals employing an oxygen-ammonia flame and to a torch suitable for the burning of ammonia.

For purposes such as the cutting or welding of metals, it is desired to produce an intense heating of restricted areas of the metal. It is well known that ammonia gas will burn in an atmosphere of oxygen but it has not been heretofore considered possible to produce the localized high heating required for cutting metals, for example, by employing a flame supplied with ammonia gas as the combustible material. Furthermore, since even small concentrations of ammonia in the atmosphere render it obnoxious and since nitrogen oxides may be formed by the combustion of ammonia in oxygen and these oxides are themselves highly objectionable, it would be expected that the use of ammonia as a fuel for the heating flame would not be satisfactory. Any unburned ammonia which escaped to the air would render the use of the ammonia burner disagreeable, if not injurious, to the operator and the formation of nitrogen oxides would be not only disagreeable to the operator but might corrode the metal articles being worked upon.

I have discovered, however, that ammonia may be burned with oxygen to produce high temperatures such as are required for welding or cutting metals. I have furthermore discovered that a high temperature ammonia-oxygen flame may be produced in which the ammonia is completely burned to produce products of combustion which are substantially non-injurious to metals subjected to treatment with the flame produced thereby. The chemical reactions occurring during the combustion of the ammonia may be represented by the following equation:

$$4NH_3 + 3O_2 = 2N_2 + 6H_2O$$

My invention comprises forming a jet of oxygen and ammonia gases and burning the jet of gases. The invention further comprises a method for cutting or welding metals employing the flame of combustion of an ammonia-oxygen mixture. In its preferred embodiment, the invention comprises a process for producing a high temperature flame such as is suitable for metal cutting and welding, and a torch adapted to carry out that process, wherein a jet of gases consisting of an inner flow of a mixture of oxygen and ammonia surrounded by an outer flow of oxygen gas is burned to produce an intensely hot flame.

For a fuller understanding of the nature and objects of the invention, reference should be had to the following detailed description taken in connection with the accompanying drawing which shows a torch suitable for the production of an oxygen-ammonia flame applicable, for example, for the welding and cutting of metals.

Referring to the drawing, the numeral 1 indicates a supply pipe for oxygen gas provided with a shut-off valve 2 and the numeral 3 indicates a supply pipe for ammonia gas provided with a shut-off valve 4. Pipe 1 branches at 5 into two pipes 6 and 7. Pipe 7 is provided with a regulator valve 8 having a lever 14 for ready control of the flow of oxygen therethrough. Pipes 3 and 6 pass through and are held by the housing of valve 8 and unite into a single pipe 9 which, together with pipe 7, leads to a burner 10. Burner 10 comprises an inner conduit 11 which communicates with pipe 9 and an outer conduit 12 communicating with pipe 7. The two conduits, 11 and 12, terminate in a tip 13 wherein the end of inner conduit 11 is concentrically positioned within the end of outer conduit 12.

In employing the torch shown in the drawing, as for example, for the cutting of metals, pipes 1 and 3 are connected with a supply of oxygen and ammonia gas respectively. Valves 2 and 4 are opened whereupon a flow of ammonia and oxygen passes through pipes 3 and 6 to mingle in pipe 9 and thence flow through conduit 11 to tip 13 where it is ignited. By pressing lever 14, regulator valve 8 allows a flow of oxygen to pass through pipe 7 so that the jet of gases issuing from tip 13 consists of an inner flow of a mixture of ammonia and oxygen from conduit 11 surrounded by an outer flow of oxygen from conduit 12. The ammonia and oxygen supplied from tip 13 burn in an intensely hot flame made up of an inner cone relatively rich in ammonia gas and an outer cone relatively poor in ammonia gas, which is applied to the work to be heated.

The torch may be provided, if desired, with needle valves for controlling the rate of flow of ammonia in pipe 3 and of oxygen in pipe 6. These needle valves may be adjusted to allow sufficient oxygen to pass through pipe 6 to completely burn the ammonia from pipe 3 which mixes with it and is ejected through conduit 11, so that the flame produced contains an excess of oxygen supplied through conduit 12 from pipe 7. This method of operating the torch is of particular value for the cutting of metals where the metal fused from the cut is to be oxidized in the excess of oxygen to increase the speed of cutting. A second manner of adjusting the needle valves may be to permit insufficient oxygen to pass through pipe 6 to completely combine with the ammonia from pipe 3, and to supply additional oxygen for the combustion of the ammonia through pipe 7. This manner of operation of the torch is particularly desirable for use in the welding of metals where a highly oxidizing flame is not desirable.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense. For example, the torch particularly described above may be modified by omitting pipe 6, in which case a substantially pure ammonia gas is ejected from inner conduit 11 and burns with the oxygen gas from the outer conduit 12. Furthermore, while the use of a concentrated oxygen gas is desirable where a high temperature flame is to be produced, my invention includes within its scope the use of air or oxygen enriched air for the combustion of the ammonia.

While this invention has been particularly described in connection with the cutting or welding or metals, it is not limited thereto but may be employed in any process where a zone of high temperature is to be maintained. I have found, for example, that relatively refractory materials such as metallic platinum or alundum may be readily fused by means of the high temperature flame of this invention.

I claim:

1. The method of maintaining a zone of high temperature which comprises feeding to said zone a jet of gases consisting of an inner flow of a mixture of oxygen and ammonia surrounded by an outer flow of oxygen.

2. The process of heating metal to cutting, brazing and welding temperatures which comprises applying the flame of combustion of ammonia and oxygen to the metal.

3. The process of heating metal to cutting, brazing and welding temperatures which comprises feeding a jet of gases comprising oxygen and ammonia to a flame of combustion of said gases, and applying said flame to the metal.

4. The process of heating metal to cutting, brazing and welding temperatures which comprises mixing ammonia with oxygen and applying the flame of combustion of the ammonia-oxygen mixture to the metal.

5. The process of heating metal to cutting, brazing and welding temperatures which comprises feeding a jet of gases consisting of an inner flow of an ammonia gas surrounded by an outer flow of an oxygen gas to a flame of combustion of said gases and applying said flame to the metal.

6. The method of maintaining a zone of high temperature which comprises feeding to said zone a jet of gases consisting of an inner flow of an ammonia gas surrounded by an outer flow of an oxygen gas.

ALBERT GEORGE STERN.